(12) United States Patent
Kamei et al.

(10) Patent No.: US 9,690,122 B2
(45) Date of Patent: Jun. 27, 2017

(54) OPTICAL SEMICONDUCTOR DEVICE

(71) Applicant: National Institute of Advanced Industrial Science and Technology, Tokyo (JP)

(72) Inventors: Toshihiro Kamei, Ibaraki (JP); Ryohei Takei, Ibaraki (JP); Masahiko Mori, Ibaraki (JP); Youichi Sakakibara, Ibaraki (JP); Makoto Okano, Ibaraki (JP)

(73) Assignee: NATIONAL INSTITUTE OF ADVANCED INDUSTRIAL SCIENCE AND TECHNOLOGY (JP)

( * ) Notice: Subject to any disclaimer, the term of this patent is extended or adjusted under 35 U.S.C. 154(b) by 0 days.

(21) Appl. No.: 14/345,915

(22) PCT Filed: Feb. 28, 2014

(86) PCT No.: PCT/JP2014/055124
§ 371 (c)(1),
(2) Date: Mar. 19, 2014

(87) PCT Pub. No.: WO2015/129039
PCT Pub. Date: Sep. 3, 2015

(65) Prior Publication Data
US 2016/0357035 A1    Dec. 8, 2016

(30) Foreign Application Priority Data
Feb. 26, 2014  (JP) .................................. 2014-035644

(51) Int. Cl.
*G02F 1/035*    (2006.01)
*G02F 1/025*    (2006.01)
(Continued)

(52) U.S. Cl.
CPC ............ *G02F 1/025* (2013.01); *G02F 1/2257* (2013.01); *G02F 2001/0151* (2013.01);
(Continued)

(58) Field of Classification Search
CPC ........ G02F 1/225; G02F 1/2255; G02F 1/035; G02F 1/0356; G02F 1/025; G02F 1/2257
See application file for complete search history.

(56) References Cited

U.S. PATENT DOCUMENTS

| 5,730,808 A | 3/1998 | Yang et al. ................... 385/249 |
| 6,282,345 B1 | 8/2001 | Schimpe ........................ 385/50 |

(Continued)

FOREIGN PATENT DOCUMENTS

| JP | H08316485 | 11/1996 | ............. H01L 21/20 |
| JP | H1074969 | 3/1998 | ............. C23C 16/40 |

(Continued)

OTHER PUBLICATIONS

International Preliminary Report on Patentability issued in application No. PCT/JP2014/055124, dated Sep. 9, 2016 (10 pgs).
(Continued)

*Primary Examiner* — Jennifer Doan
(74) *Attorney, Agent, or Firm* — Hayes Soloway P.C.

(57) ABSTRACT

An optical semiconductor device in which a first optical waveguide 407 comprising a silicon-containing amorphous semiconductor layer and a second optical waveguide 409 containing a silicon-containing i-type semiconductor layer as a constituent element are disposed in different layers in a range in which optical interaction can occur. An electro-optical modulator 409 having a pin junction structure comprising a p-type semiconductor layer 403, an i-type semiconductor layer 404, and an n-type semiconductor layer 405 is provided to at least a portion of the second optical waveguide 409, and the index of refraction of the second (Continued)

optical waveguide is varied by the electro-optical modulator, whereby light waves propagated through the first optical waveguide are modulated.

19 Claims, 8 Drawing Sheets

(51) Int. Cl.
  *G02F 1/225* (2006.01)
  *G02F 1/015* (2006.01)
  *G02F 1/21* (2006.01)
(52) U.S. Cl.
  CPC .. *G02F 2001/212* (2013.01); *G02F 2202/103* (2013.01); *G02F 2202/105* (2013.01)

(56) References Cited

U.S. PATENT DOCUMENTS

| | | | |
|---|---|---|---|
| 6,522,799 B1 | 2/2003 | Bazylenko et al. | 385/14 |
| 7,257,283 B1 | 8/2007 | Liu et al. | 385/14 |
| 2002/0176467 A1 | 11/2002 | Yang et al. | 372/50 |
| 2004/0235267 A1* | 11/2004 | Sheats | H01L 21/67092 438/455 |
| 2006/0246269 A1* | 11/2006 | Yukawa | B82Y 10/00 428/209 |
| 2011/0293216 A1 | 12/2011 | Lipson et al. | 385/14 |
| 2012/0057815 A1 | 3/2012 | Ezaki et al. | 385/3 |
| 2012/0243828 A1 | 9/2012 | Suzuki | 385/32 |
| 2013/0044973 A1 | 2/2013 | Akiyama | 385/2 |
| 2013/0251300 A1 | 9/2013 | Suzuki et al. | 385/1 |

FOREIGN PATENT DOCUMENTS

| | | | |
|---|---|---|---|
| JP | H11283922 | 10/1999 | H01L 21/20 |
| JP | 2001500280 | 1/2001 | G02B 6/12 |
| JP | 2002540452 | 11/2002 | G02B 6/12 |
| JP | 2004031518 | 1/2004 | H01L 31/04 |
| JP | 2005508014 | 3/2005 | G02B 6/12 |
| JP | 2008065030 | 3/2008 | G02F 1/035 |
| JP | 2009-537871 | 10/2009 | G02B 6/122 |
| JP | 2012053399 | 3/2012 | G02F 1/025 |
| JP | 2012198465 | 10/2012 | G02F 1/025 |
| JP | 2013041138 | 2/2013 | G02F 1/025 |
| JP | 2014-027772 | 2/2014 | H02J 17/00 |

OTHER PUBLICATIONS

Shoji, Y. et al. "Ultrafast nonlinear effects in hydrogenated amorphous silicon wire waveguide" *Optics Express* vol. 18, No. 6, Mar. 15, 2010 (6 pgs).
Della Corte, F. G. et al. "Electro-optical modulation at 1550 nm in an as-deposited hydrogenated amorphous silicon p-i-n. waveguiding device" *Optics Express* vol. 19, No. 14, Feb. 4, 2011 (11 pgs).
European Search Report issued in application No. 14160550.1, dated Jul. 30, 2014 (6 pgs).
International Search Report issued in application No. PCT/JP2014/055124, dated May 9, 2014 (2 pgs).
Reed et al., "Silicon Photonics—The Early Years," Proceedings of SPIE, vol. 5730, Mar. 7, 2005 (18 pgs).
Cocorullo et al., "Amorphous Silicon-Based Guided-Wave Passive and Active Devices for Silicon Integrated Optoelectronics," IEEE Journal of Selected Topics in Quantum Electronics, IEEE Service Center, Piscataway, NJ, US, vol. 4, No. 6, Dec. 1, 1998 (6 pgs).

\* cited by examiner

OPTICAL SEMICONDUCTOR DEVICE

TECHNICAL FIELD

The present invention relates to an optical semiconductor device provided with an electro-optical modulator.

BACKGROUND ART

Silicon photonic technology in which optical devices and electronic devices are highly integrated in a hybrid fashion on the same silicon substrate are receiving considerable attention. These techniques are naturally being applied to the field of optical communication, but there are also high expectations for application to the field of optical interconnects in integrated circuits, and such research and development is currently being actively pursued.

In silicon photonic techniques, it is common to use a silicon-on-insulator (SOI) substrate in which a crystal silicon (c-Si) has been formed on a buried oxide film (BOX), but there is a problem in that a process of very high temperatures of 1100° C. or higher is generally required to form c-Si, and SOI substrates are costly.

In view of these problems, silicon photonic techniques have been proposed that use a hydrogenated amorphous silicon (a-Si:H) having optical characteristics that rival c-Si or surpass c-Si in terms of nonlinear optical characteristics in some applications, while being capable of depositing a film at a low temperature of 400° C. or less, and various passive elements have been researched and developed.

However, it is obvious that a high-speed electro-optical conversion device, an optical switching device, or another active device that switches an optical path using an electric signal would be required in order to carry out electrical signal communication using light waves as carrier waves, but there are not many reports related these elements. A possible reason for this is that a-Si:H is an amorphous material, and therefore has poor mobility, electrical conductivity, and other electrical characteristics.

It is known, as indicated in non-patent document 1, that electrons injected or excited inside the a-Si:H by some technique relax in a very short period of time, typically on a sub-picosecond timescale, and this is due to the fact that relaxation of wave function of the carriers from an extended state to a localized state, specifically, a tail state, is extremely fast. Since the tail state originates from fluctuation in the Si bond length or the bonding angle, high-speed carrier relaxation can be said to be a phenomenon unique to amorphous semiconductors, originating from random structures.

Many electro-optical modulators based on c-Si have been reported (e.g., patent document 1), but, in the case of c-Si, one of major factors is that the carrier relaxation time is relatively long and modulation speed is limited. In other words, in terms of the carrier relaxation time, a-si:H can be said to have advantageous characteristics as a high-speed electro-optical modulator in comparison with c-Si.

FIG. 6 shows a cross-sectional schematic view of the conventional electro-optical modulator disclosed in non-patent document 2.

This electro-optical modulator is provided with: an i-type a-Si:H layer 103 as a waveguide core without addition of impurities into a silicon substrate 101; a p-type a-SiC:H layer 102 as a lower cladding layer between the silicon substrate 101 and the i-type a-Si:H layer 103; the p-type a-SiC:H layer being a p-type semiconductor obtained by adding impurities into a hydrogenated amorphous silicon carbide (a-SiC:H) having a slightly lower index of refraction than an i-type a-Si:H while being capable of low-temperature growth in the same manner as an i-type a-Si:H; an n-type a-SiC:H layer 104 to which impurities have been added as an upper cladding layer on the i-type a-Si:H layer 103; a zinc oxide/aluminum electrode 105 disposed thereon.

The electro-optical modulator shown FIG. 6 comprises an optical waveguide structure in which the i-type a-Si:H layer 103 having the highest index of refraction is used as a waveguide core, and at the same time, the p-type layer (102), the i-type layer (103), and the n-type layer (104) constitute a pin structure. In this electro-optical modulator, the electrical conductivity of the a-SiC:H in the n-type layer (104) and the p-type layer (102) is $2.3 \times 10^{-6}$ S/cm and $1.9 \times 10^{-8}$ S/cm, respectively.

The electro-optical modulator is connected to an external power source so that voltage is applied to the i-type a-Si:H layer 103 by way of the silicon substrate 101 and the zinc oxide/aluminum electrode 105 of the upper part of the waveguide. When a reverse bias is applied to the i-type layer (103), a depletion layer spreads to the p-type layer (102) and n-type layer (104) sides, the carrier density of the i-type layer (103) decreases, and the index of refraction of the i-type a-Si:H layer 103 increases.

Phases of the light waves propagated through a waveguide having the i-type a-Si:H layer 103 as a waveguide core can thereby be modulated. In this case, the operating speed of the electro-optical modulator is limited mainly by the electrical conductivity and mobility of the p-type layer (102) and the n-type layer (104), but in the case of the electro-optical modulator described in non-patent document 2, a-SiC:H, which has very low mobility and electrical conductivity, is used as the p-type layer (102) and the n-type layer (104), and it is therefore very difficult to obtain high-speed modulating operation that exceeds 1 Gbps. In other words, the high-speed carrier relaxation characteristics of a-Si:H are not being taken advantage of in this electro-optical modulator.

In order to solve the above-described problem, the present inventors have proposed a novel electro-optical modulator in an earlier patent application (see patent document 2).

FIG. 7 shows a cross-sectional schematic view of an example of the proposed electro-optical modulator.

This electro-optical modulator is provided with a silicon thermal oxide film 202 obtained by thermally oxidizing a silicon substrate on a silicon substrate 201, and layered thereon in the vertical direction are a boron (B)-added p-type hydrogenated microcrystalline silicon (μc-Si:H) layer 203 having a thickness of about 0.1 μm, a nondoped i-type a-Si:H layer 204 having a thickness of about 1.3 μm, and a phosphorus (P)-added n-type μc-Si:H layer 205 having a thickness of about 1.3 μm.

A silicon oxide film (206), an ITO (indium-tin oxide) film 207, and electrodes (208, 209) comprising aluminum (Al) are furthermore formed thereon.

The layers 203, 204, and 205 each have about the same index of refraction (3.4 to 3.6), have a higher index of refraction than the silicon thermal oxide film 202 having an index of refraction of about 1.44, the silicon oxide film 206, and the ITO film 207, and therefore act as an optical waveguide core and light waves are propagated therethrough.

The optical waveguide constitutes a rib structure having a width of about 3.0 μm, a height of about 1.5 μm, and a rib height of about 0.1 μm. Also, the layers 203, 204, and 205 constitute a pin structure, and electrons or positive holes can be injected into the i-type a-Si:H layer 204.

FIG. 8 shows a cross-sectional schematic view of another example of an electro-optical modulator proposed by the present inventors.

This electro-optical modulator has a p-type semiconductor layer and an n-type semiconductor layer disposed so to be layered in the vertical direction via an optical waveguide comprising an i-type amorphous semiconductor, and electrodes can be drawn out at the upper surface.

The electro-optical modulator shown in FIG. 8 is provided with a silicon thermal oxide film 302 obtained by thermally oxidizing a silicon substrate on the silicon substrate 301, and layered in the vertical direction thereon are a boron (B)-added p-type μc-Si:H layer 303, a nondoped i-type a-Si:H layer 304, and a phosphorus (P)-added n-type μc-Si:H layer 305.

A silicon oxide film 306, an IZO (indium-zinc oxide) film 307, and an electrode 308 are furthermore provided thereon. Also, an IZO film 309 and an electrode 310 are provided as a drawn-out electrode of the boron (B)-added p-type layer 303.

The layers 303, 304, and 305 each have about the same index of refraction (3.4 to 3.6), have a higher index of refraction than the silicon thermal oxide film 302 having an index of refraction of about 1.44, the silicon oxide film 306, and the IZO film 307, and therefore act as an optical waveguide core and light waves are propagated therethrough.

The optical waveguide constitutes a typical wire waveguide structure having a width of about 0.5 μm and a height of about 0.2 μm.

Also, the layers 303, 304, and 305 constitute a pin structure, and electrons or positive holes can be injected into the i-type a-Si:H layer 304.

A portion of the electro-optical modulator proposed by the present inventors was introduced above, and the proposed electro-optical modulator is summarized as follows.

(1) An electro-optical modulator provided with an optical waveguide comprising a silicon-containing i-type amorphous semiconductor, and a silicon-containing p-type semiconductor layer and a silicon-containing n-type semiconductor layer constituting an optical waveguide together with the optical waveguide comprising an i-type amorphous semiconductor and being disposed at a distance from each other via the optical waveguide comprising an i-type amorphous semiconductor, wherein the p-type semiconductor layer and/or the n-type semiconductor layer is a crystalline semiconductor layer.

(2) An electro-optical modulator provided with an SOI substrate, an optical integrated circuit substrate, or another substrate; an optical waveguide comprising a silicon-containing i-type semiconductor formed on a substrate; and a silicon-containing p-type semiconductor layer and a silicon-containing n-type semiconductor layer constituting an optical waveguide together with the optical waveguide comprising an i-type amorphous semiconductor and being disposed at a distance from each other via the optical waveguide comprising an i-type amorphous semiconductor, wherein the p-type semiconductor layer and/or the n-type semiconductor layer is a crystalline semiconductor layer.

The electro-optical modulator is capable of varying the index of refraction of the optical waveguide comprising an i-type amorphous semiconductor by applying voltage or flowing electric current between the p-type semiconductor layer and the n-type semiconductor layer.

PRIOR ART DOCUMENTS

Patent Documents

Patent Document 1: Japanese Laid-open Patent Publication No. 2009-537871
Patent Document 2: Japanese Patent Application No. 2014-27772

Non-Patent Documents

Non-patent Document 1: Y. Shoji, T. Ogasawara, T. Kamei, Y. Sakakibara, S. Suda, K. Kintaka, H. Kawashima, M. Okano, T. Hasama, H. Ishikawa, and M. Mori, "Ultrafast nonlinear effects in hydrogenated amorphous silicon wire waveguide," Opt. Express 18, 5668-5673 (2010).
Non-patent Document 2: F. G. Della Corte, S. Rao, G. Coppola, and C. Summonte, "Electro-optical modulation at 1550 nm in an as-deposited hydrogenated amorphous silicon p-i-n waveguiding device," Opt. Express 19, 2941-2951 (2011).

DISCLOSURE OF THE INVENTION

Problems to be Solved by the Invention

In a silicon optical waveguide-type electro-optical modulator, a pn junction, a pin junction, or another mechanism for controlling the carrier density in the optical waveguide is imparted to the silicon optical waveguide structure.

When the above-described mechanism is implemented by means of low-temperature growth by chemical vapor deposition (CVD), plasma-enhanced CVD (PECVD), or the like, $B_2H_6$, $PH_3$, or another impurity gas is added to the $SiH_4$ or another source gas to thereby perform valence electron control, and since a p-type silicon layer, an i-type silicon layer, and an n-type silicon layer are formed in continuous fashion, a pin-layered structure is obtained in the vertical direction.

On the other hand, it has been confirmed by experimentation that silicon to which boron (B), phosphorus (P), or other impurity has been added have a large number of free carriers present at room temperature, and have optical absorption substantially proportional to free carrier density in accordance with a Drude relational expression in the waveband used mainly in optical communication (a waveband centered around 1550-nm wavelength). The electric conductivity of the p-type silicon layer and the n-type silicon layer is preferably as high as possible in order to drive an electro-optical modulator at high speed, but conversely, there is a problem in that optical absorbency is increased. Accordingly, it is preferred that a nondoped i-type silicon layer or with minimal amount of impurities be used as a waveguide that does not have a modulator function.

At this time, it is very difficult optically connect an electro-optical modulator having a layered pin structure and an optical waveguide comprising an i-type silicon layer, and since a p-type silicon layer and an n-type silicon layer must be formed by patterning and etching only in the locations of the electro-optical modulator, a pin structure cannot be fabricated in continuous fashion, and it is not possible to avoid a more complicated and higher-cost manufacturing process.

However, in an electro-optical modulator having a lateral pin structure or pn structure, optical coupling with an i-type silicon layer is not so difficult, but ordinarily a 200-nm gap must be formed between the waveguide and, e.g., a ring resonator-type electro-optical modulator in order to optically couple the two together in the same plane. Such a gap structure can be formed using a liquid-immersion exposure apparatus that uses a high-cost excimer laser, but such a gap is difficult to form using a low-cost i-line exposure apparatus.

Therefore, an object of the present invention is to provide an optical semiconductor device in which an electro-optical modulator is separated into a layer different from an optical waveguide, and in which optical coupling loss with the optical waveguide is kept to a minimum and low-cost manufacturing is possible.

Means for Solving the Problems

Means for solving the above-stated problems are as follows.

(1) An optical semiconductor device, characterized in that a first optical waveguide comprising a silicon-containing amorphous semiconductor layer and a second optical waveguide containing a silicon-containing i-type semiconductor layer as a constituent element are disposed in different layers in a range in which optical interaction can occur, an electro-optical modulator having a pin junction structure comprising a p-type semiconductor layer, an i-type semiconductor layer, and an n-type semiconductor layer is provided to at least a portion of the second optical waveguide, and the index of refraction of the second optical waveguide is varied by the electro-optical modulator to thereby modulate the light waves propagated through the first optical waveguide.

(2) The optical semiconductor device according to (1), characterized in that the silicon-containing amorphous semiconductor layer constituting the first optical waveguide is a hydrogenated amorphous silicon layer.

(3) The optical semiconductor device according to (1) or (2), characterized in that the silicon-containing i-type semiconductor layer is an i-type amorphous semiconductor layer.

(4) The optical semiconductor device according to (3), characterized in that the silicon-containing i-type semiconductor layer is a hydrogenated amorphous silicon layer.

(5) The optical semiconductor device according to (3), characterized in that the silicon-containing i-type semiconductor layer is a hydrogenated amorphous Si—Ge layer.

(6) The optical semiconductor device according to any of (1) to (5), characterized in that the p-type semiconductor layer and/or the n-type semiconductor layer constituting the pin junction in the electro-optical modulator is a silicon-containing a crystalline semiconductor layer.

(7) The optical semiconductor device according to (6), characterized in that the silicon-containing crystalline semiconductor layer comprises a microcrystalline silicon layer.

(8) The optical semiconductor device according to (6), characterized in that the silicon-containing crystalline semiconductor layer comprises a laser-crystallized silicon layer.

(9) The optical semiconductor device according to (6), characterized in that the silicon-containing crystalline semiconductor layer comprises a solid-phase crystallized silicon layer induced by a metal catalyst.

(10) The optical semiconductor device according to (6), characterized in that the silicon-containing crystalline semiconductor layer comprises a single-crystal silicon layer.

(11) The optical semiconductor device according to (6), characterized in that silicon-containing crystalline semiconductor layer comprises a microcrystalline SiC layer.

(12) The optical semiconductor device according to (6), characterized in that the silicon-containing crystalline semiconductor layer is a microcrystalline SiO layer.

(13) The optical semiconductor device according to any of (1) to (12), characterized in that the p-type semiconductor layer and the n-type semiconductor layer are disposed so to be layered in the vertical direction via a silicon-containing i-type semiconductor layer, which is a constituent element of the second optical waveguide.

(14) The optical semiconductor device according to any of (1) to (12), characterized in that the p-type semiconductor layer and the n-type semiconductor layer are disposed so to be layered in the lateral direction via a silicon-containing i-type semiconductor layer, which is a constituent element of the second optical waveguide.

(15) The optical semiconductor device according to any of (1) to (14), characterized in that the second optical waveguide containing the silicon-containing i-type semiconductor layer as a constituent element is a ring resonator-type optical waveguide.

(16) The optical semiconductor device according to any of (1) to (14), characterized in that the optical semiconductor device is a Mach-Zehnder interferometer and has a second optical waveguide provided with an electro-optical modulator having the pin junction structure disposed so as to be separated by an interlayer film in the layering direction in an interference arm.

Effect of the Invention

In accordance with the present invention, a first optical waveguide that requires modulation is disposed in a layer different from the second optical waveguide provided with an electro-optical modulator having a pin junction structure, and it is therefore possible to obtain a optical semiconductor device in which optical coupling loss between the first optical waveguide and the second optical waveguide is kept to a minimum.

Furthermore, in terms of manufacturing processes, the formation of a passive circuit and the formation of an active circuit can be separated into different layers, and the manufacturing processes are therefore simplified, allowing for the use of an i-line exposure apparatus. Therefore, such a configuration is effective in reducing costs.

MODE FOR CARRYING OUT THE INVENTION (The Optical Semiconductor Device According to the Present Invention)

Figure 1:
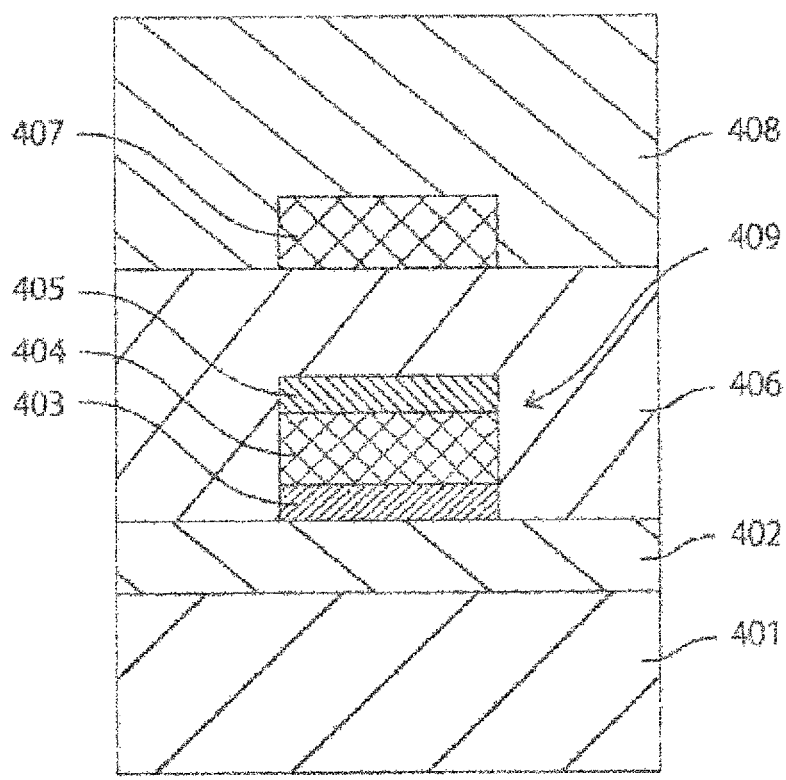
FIG. 1 is a cross-sectional conceptual view of the optical semiconductor device according to the present invention.

FIG. 1 is a conceptual view of the cross-sectional structure of the optical semiconductor device according to the present invention.

In the optical semiconductor device according to the present invention, a first optical waveguide 407 comprising a silicon-containing semiconductor layer and a second optical waveguide 409 containing a silicon-containing i-type semiconductor layer 404 as a constituent element are disposed in different layers in a range in which optical interaction can occur. An electro-optical modulator 409 having a pin junction structure comprising a silicon-containing p-type semiconductor layer 403, a silicon-containing i-type semiconductor layer 404, and a silicon-containing n-type semiconductor layer 405 is provided to at least a portion of the second optical waveguide 409.

In the optical semiconductor device according to the present invention, light waves propagated through the first optical waveguide 407 are moved to the second optical waveguide 409 containing a silicon-containing i-type semiconductor layer as a constituent element by optical interaction, and the index of refraction of the second optical waveguide 409 is varied by the electro-optical modulator 409 having a pin junction structure in at least a portion thereof to thereby modulate the light waves and thereafter return the propagated light waves to the first optical waveguide 407. When the second optical waveguide 409, which is also an electro-optical modulator, has a resonator structure, the light waves propagated through the first optical waveguide 407 do not optically interact with the second optical waveguide depending on the resonance conditions, and are propagated through the first optical waveguide 407 straightforwardly.

The positions of the silicon-containing p-type semiconductor layer 403 and the silicon-containing n-type semiconductor layer 405 can be switched with each other.

Also, positions of the first optical waveguide 407 and the second optical waveguide 409 can also be switched with each other as long as they are disposed in mutually different layers.

Embodiments of the optical semiconductor device according to the present invention will be introduced below with reference to FIGS. 2 to 5.

The embodiments presented as examples below are used for facilitating understanding of the optical semiconductor device according to the present invention, and modifications, other embodiments, and the like based on the technical concepts of the present invention indicated in the claims are naturally also included in the optical semiconductor device of the present invention.

(First Embodiment)

Figure 2:
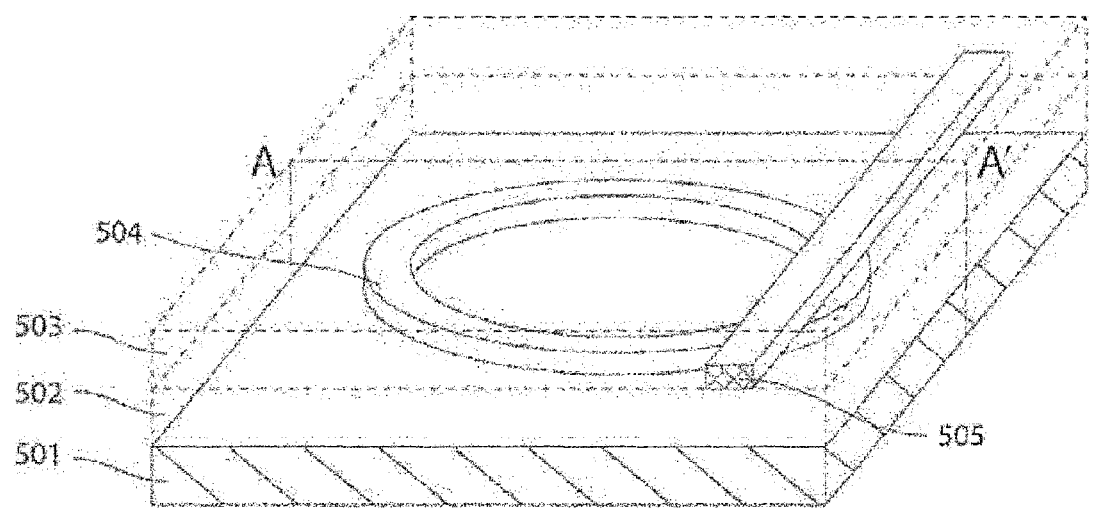
FIG. 2 is a bird's-eye view of the optical semiconductor device according to a first embodiment.

FIG. 2 is a first embodiment of the present invention and is a bird's-eye view thereof.

In the first embodiment, a ring resonator-type optical waveguide is used as the second optical waveguide in which a silicon-containing i-type semiconductor layer is included as a constituent element.

This optical semiconductor device is provided with: a lower cladding layer 501 comprising a typical silicon oxide film having low optical absorption loss and a lower index of refraction than a ring resonator-type optical waveguide 504; an interlayer film 502 comprising a typical silicon oxide film having low optical absorption loss and a lower index of refraction than the ring resonator-type optical waveguide 504 provided with an electro-optical modulator and a first optical waveguide 505 comprising a silicon-containing semiconductor layer; a ring resonator-type optical waveguide 504 provided with an electro-optical modulator having a pin junction structure on the lower cladding layer 501 and disposed so as to provide mutual separation from a first optical waveguide 505 by the interlayer film 502 in the layering direction; and a first optical waveguide 505 comprising, e.g., a hydrogenated amorphous silicon (a-Si:H) or another a silicon-containing semiconductor layer that can be deposited at low-temperature. Formed thereon is an upper cladding layer 503 comprising a typical silicon oxide film having low optical absorption loss and a lower index of refraction than the first optical waveguide 505.

Figure 3:
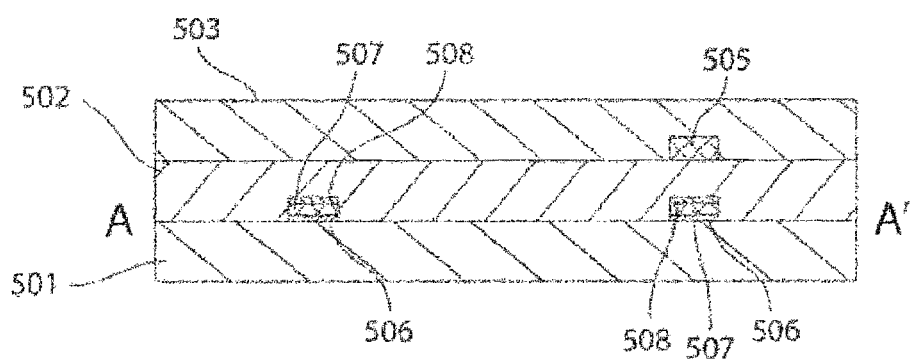
FIG. 3 is a cross-sectional schematic view along the line A-A' of the optical semiconductor device according to the first embodiment.

FIG. 3 is a cross-sectional schematic view along the line A-A' thereof. In FIG. 3, a p-type crystalline silicon layer 506, an i-type hydrogenated amorphous silicon layer 507, and an n-type crystalline silicon layer 508 constitute a ring resonator-type optical waveguide provided with an electro-optical modulator having a pin junction structure.

(Fabrication of the First Embodiment)

Described next are the fabrication processes of the optical semiconductor device.

(1) A silicon oxide film is deposited on a SOI substrate, an optical integrated circuit substrate, or another substrate using tetraethoxysilane (TEOS) as the source gas to thereby form a lower cladding layer 501. The surface of the silicon oxide film is polished, as needed, by chemical-mechanical polishing (CMP).

(2) Three silicon film layers comprising the p-type crystalline silicon layer 506, the i-type hydrogenated amorphous silicon layer 507, and the n-type crystalline silicon layer 508 that constitute a pin structure are thereafter formed on the silicon oxide film by PECVD.

(3) A second optical waveguide having a pin junction structure comprising a silicon-containing i-type semiconductor layer is fabricated using an conventional semiconductor process, and an interlayer film 502, which is a silicon oxide film, is formed in order to ensure optical and electrical insulation between the upper layer and the lower layer. The surface of the silicon oxide film is polished, as needed, by chemical-mechanical polishing (CMP).

(4) Next, a-Si:H is deposited on the interlayer film 502, which is a silicon oxide film, and the first optical waveguide having a-Si:H as the core is formed by an ordinary semiconductor process. Lastly, a silicon oxide film is deposited to form the upper cladding layer 503.

In the first embodiment, a silicon oxide film is given as an example of a film for constituting the lower cladding layer 501, the interlayer film 502, and the upper cladding layer 503, but it is also possible to use a silicon suboxide film (SiOx), a silicon nitride film, a silicon oxynitride film, or the like as long as the insulating material has a lower index of refraction than a-Si:H.

Also, the structure of the first optical waveguide 505 comprising a silicon-containing semiconductor layer is merely given as an example, and there may be at least one optical waveguide that functions in the manner of the first optical waveguide 505 comprising a silicon-containing semiconductor layer, and the arrangement thereof may be any arrangement as long as it is in a range in which optical interaction can occur with the ring resonator-type optical waveguide 504 provided with an electro-optical modulator.

(Operation of the Electro-optical Modulator)

The operation of the above-described electro-optical modulator will be described.

Controlling the voltage applied to the pin structure of the ring resonator-type optical waveguide 504 comprising a silicon-containing i-type semiconductor layer makes it possible to control the index of refraction of the i-type semiconductor layer. In other words, it is possible to control the propagation constant of the light wave propagated through the ring resonator-type optical waveguide 504 comprising a silicon-containing i-type semiconductor layer.

(Operation of the Optical Semiconductor Device)

The resonant wavelength of light waves is determined by the applied voltage, the electromagnetic distribution of the light waves propagated through the ring resonator-type optical waveguide 504 comprising a silicon-containing i-type semiconductor layer provided with an electro-optical modulator, and the material or shape within the range that the propagating light waves can interact, and when the light waves are incident on the first optical waveguide 505 from the front side on the plane of the drawing, the light waves propagated through the first optical waveguide 505 couple with the ring resonator-type optical waveguide 504 provided with an electro-optical modulator in a location where the first optical waveguide 505 and the ring resonator-type optical waveguide 504 provided with an electro-optical modulator are close together, and the light transmitted to the back side of the first optical waveguide 505 in terms of the plane of the drawing is reduced.

When the voltage applied to the ring resonator-type optical waveguide 504 provided with an electro-optical modulator is varied from the above-described state, the index of refraction of the ring resonator-type optical waveguide 504 provided with an electro-optical modulator is varied, and since the resonance wavelength is varied, the light waves incident from the front side of the first optical waveguide 505 do not couple with the ring resonator-type optical waveguide 504 provided with an electro-optical modulator and are transmitted to the back side of the first optical waveguide 505 in terms of the plane of the drawing. In other words, the intensity of the light waves transmitted to the back side of the first optical waveguide 505 in terms of the plane of the drawing can be controlled by the voltage applied to the ring resonator-type optical waveguide 504 provided with an electro-optical modulator.

(Second Embodiment)

Figure 4:
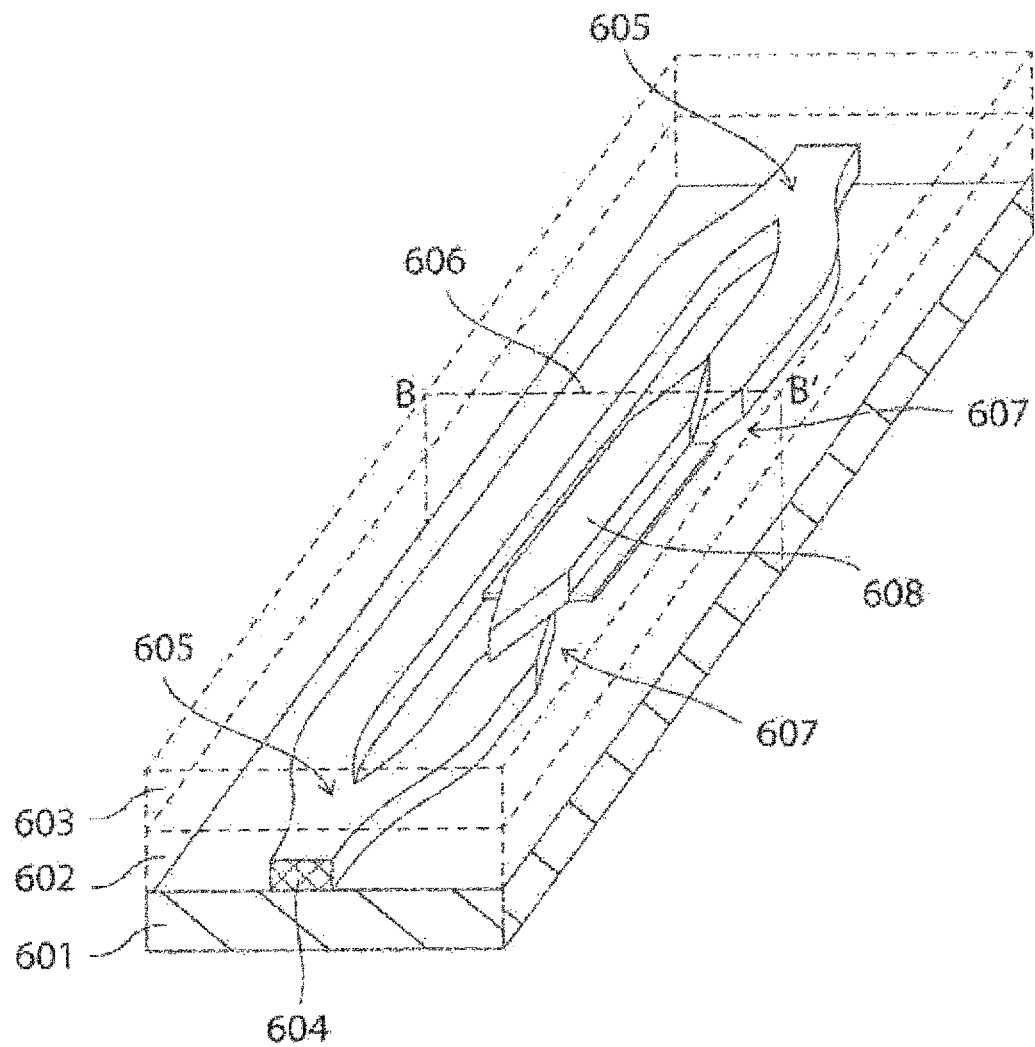
FIG. 4 is a bird's-eye view of the optical semiconductor device according to a second embodiment.

FIG. 4 is a second embodiment of the present invention and is a bird's-eye view thereof.

The optical semiconductor device is provided with an i-type hydrogenated amorphous silicon layer 608 on an interlayer film 602 disposed so as to provide mutual separation by the interlayer film 602 in the layering direction in an interference arm of a Mach-Zehnder interferometer configured with two optical multiplexer/demultiplexers 605.

The optical semiconductor device is also provided with: a lower cladding layer 601 comprising a typical silicon oxide film having low optical absorption loss and a lower index of refraction than a silicon optical waveguide 604; an interlayer film 602 comprising a typical silicon oxide film having low optical absorption loss and a lower index of refraction than a vertical directional coupler 607 and the i-type hydrogenated amorphous silicon layer 608, which constitute optical waveguide of the upper layer; a vertical directional coupler 607; a silicon optical waveguide 604 that can be deposited at low-temperature such as a-Si:H; two optical multiplexer/demultiplexers 605; and a interference optical waveguide 606.

An upper cladding layer 603 comprising a typical silicon oxide film having low optical absorption loss and a lower index of refraction than the aforesaid optical waveguide is provided to the vertical directional coupler 607 and the i-type hydrogenated amorphous silicon layer 608 that constitute the optical waveguide of the upper layer.

Figure 5:
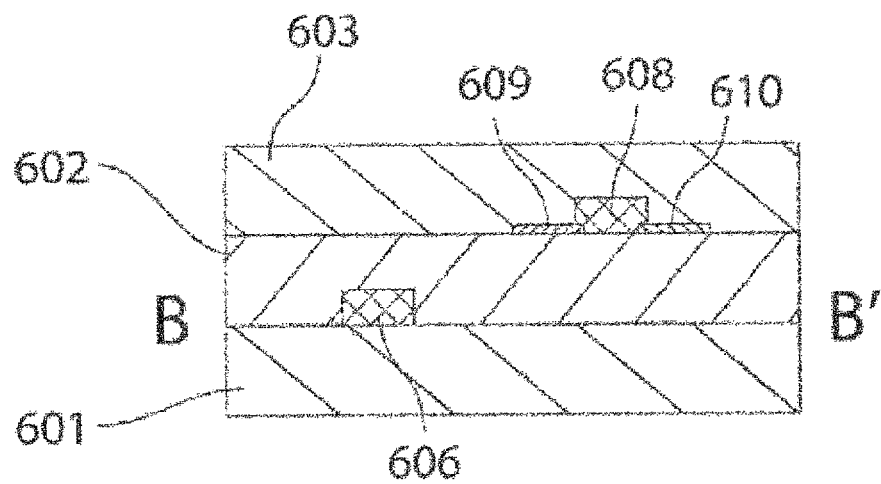
FIG. 5 is a cross-sectional schematic view along the line B-B' of the optical semiconductor device according to the second embodiment.
Figure 6:
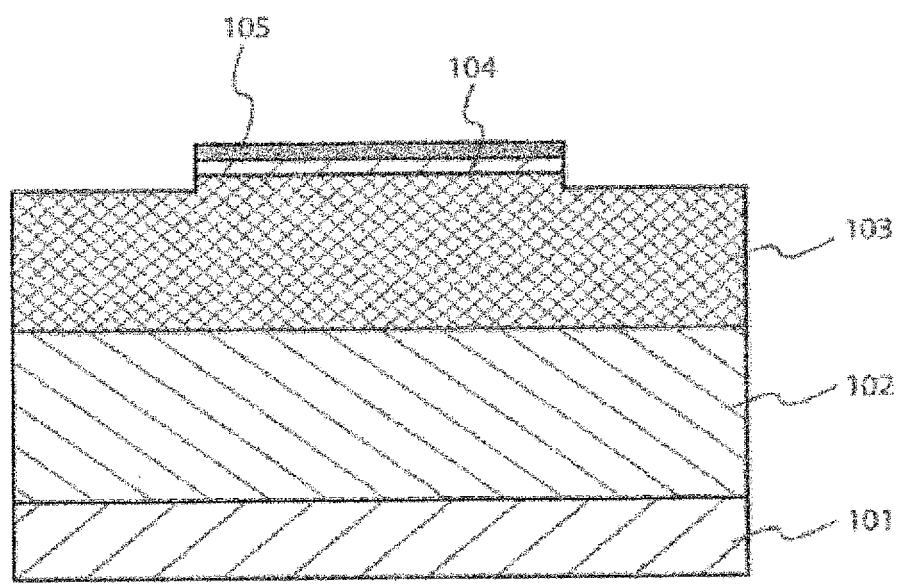
FIG. 6 shows a cross-sectional schematic view of a conventional electro-optical modulator.
Figure 7:
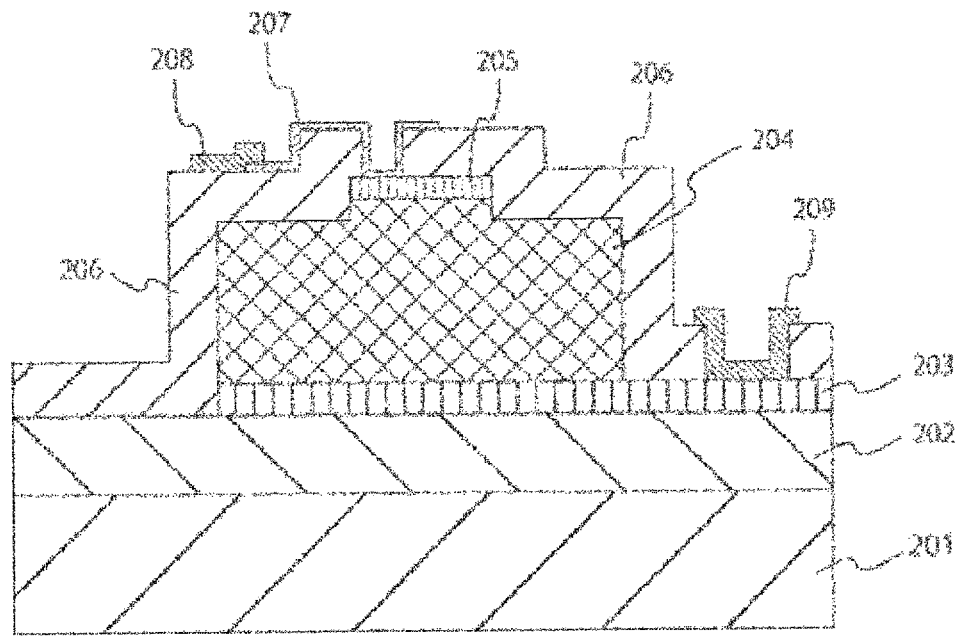
FIG. 7 shows a cross-sectional schematic view of an example of an electro-optical modulator proposed by the present inventors.
Figure 8:
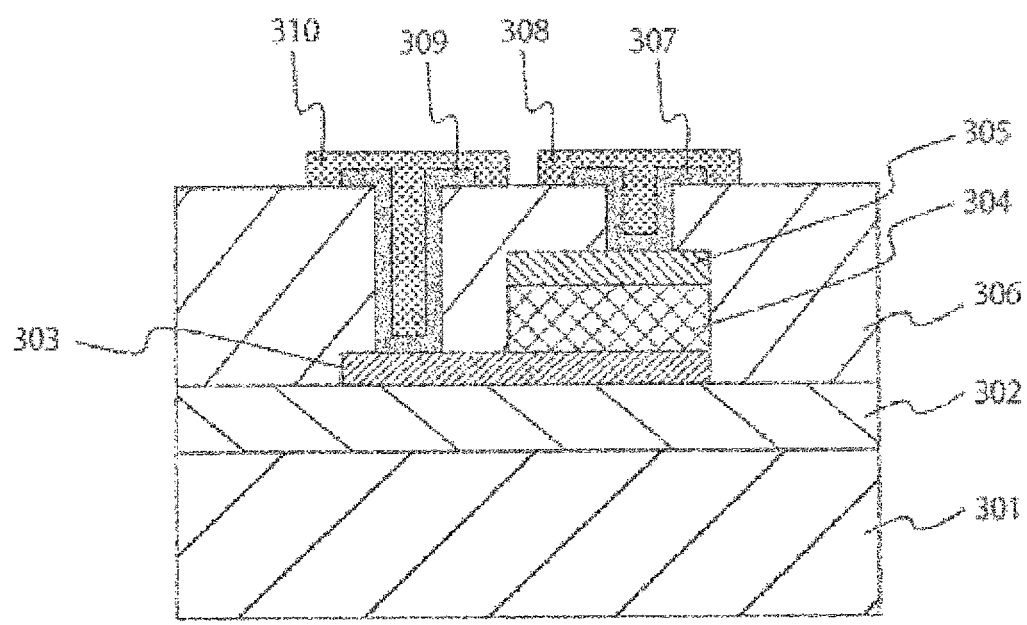
FIG. 8 shows a cross-sectional schematic view of another example of an electro-optical modulator proposed by the present inventors.

FIG. 5 is a cross-sectional schematic view along the line B-B' thereof. In FIG. 5, a p-type crystalline silicon layer 609, the i-type hydrogenated amorphous silicon layer 608, and an n-type crystalline silicon layer 610 constitute an electro-optical modulator having a pin junction structure.

The optical waveguide of the lower layer and the optical waveguide comprising the i-type hydrogenated amorphous silicon layer 608 disposed on the upper layer is provided with a mechanism comprising a vertical directional coupler 607 which is capable of coupling light waves between the upper and lower layers.

Only one example of the mechanism of the light wave coupling between the upper and lower layers is given, but it is also possible to use, e.g., a grating coupler or the like as long as light waves can be made to couple between the upper and lower layers.

The optical multiplexer/demultiplexers 605 constituting a Mach-Zehnder interferometer may be, e.g., a multi-mode interference waveguide (MMI) optical multiplexer/demultiplexer or the like as long as light waves can be multiplexed and demultiplexed.

The i-type hydrogenated amorphous silicon layer 608 and the vertical directional coupler 607, which is a mechanism for coupling light waves between the upper and lower layers, may be introduced in at least one location in the Mach-Zehnder interferometer, and may be inserted at an intermediate point in the interference optical waveguide 606.

The fabrication processes of the optical semiconductor device are the same as in the first embodiment.

Next, the operation of the above-described optical semiconductor device will be described. Light waves incident on the silicon optical waveguide 604 from the front side on the plane of the drawing are demultiplexed by the optical multiplexer/demultiplexers 605. One of the demultiplexed light waves couples with the optical waveguide comprising the i-type hydrogenated amorphous silicon layer 608 of the upper layer by a mechanism comprising the vertical directional coupler 607. The optical waveguide comprising the i-type hydrogenated amorphous silicon layer 608 modulates the propagated light waves to a propagation constant by the same principles described above. The light waves are again returned to the lower layer by a mechanism comprising the vertical directional coupler 607 for coupling the light waves between the upper and lower layers.

A phase difference is generated between the modulated light waves and the light waves being propagated through the interference optical waveguide 606. Therefore, the light intensity after multiplexing is varied by the optical multiplexer/demultiplexers 605 in accordance with the phase difference. When these two sets of light waves are in phase, the light waves are multiplexed and light is transmitted to the back side of the plane of the drawing.

Conversely, when the two sets of light waves are in opposite phase, the light waves do not multiplex and are not transmitted. In other words, the intensity of the light waves transmitted to the back side of the plane of the drawing of the optical multiplexer/demultiplexers 605 can be controlled by the voltage applied to the pin junction structure comprising the p-type crystalline silicon layer 609, the i-type hydrogenated amorphous silicon layer 608, and the n-type crystalline silicon layer 610.

In the embodiments described above, a hydrogenated amorphous silicon layer was given as an example of the first optical waveguide comprising a silicon-containing semiconductor layer, but it is also possible to use, e.g., hydrogenated amorphous Si—Ge, hydrogenated amorphous Si—C, or a silicon-containing amorphous semiconductor layer such as a silicon nitride film.

In the embodiments, hydrogenated amorphous silicon was given as an example of the silicon-containing i-type amorphous semiconductor, but it is also possible to use hydrogenated amorphous Si—Ge. In particular, hydrogenated amorphous Si—Ge has a high index of refraction in comparison with amorphous silicon and crystalline silicon, and light can be efficiently confined in an i-type amorphous semiconductor. Therefore, optical loss can be reduced.

Furthermore, in the embodiments, a p-type crystalline silicon layer and an n-type crystalline silicon layer were given as examples of the p-type semiconductor layer and the n-type semiconductor layer constituting the pin junction structure, and it is preferred that a hydrogenated microcrystalline silicon, a laser-crystallized silicon, a solid-phase crystallized silicon induced by metal catalyst, a single-crystalline silicon layer, a microcrystalline SiC, or a microcrystalline SiO be used as the crystalline silicon. In particular, microcrystalline SiC and microcrystalline SiO have a low index of refraction in comparison with amorphous silicon and crystalline silicon, and light can be efficiently confined in an i-type amorphous semiconductor layer. Therefore, optical loss can be reduced.

The p-type semiconductor layer and/or the n-type semiconductor layer constituting the pin junction structure is preferably a crystalline silicon layer.

In other words, the p-type semiconductor layer and/or the n-type semiconductor layer is a crystalline semiconductor layer such as a hydrogenated microcrystalline silicon (μc-Si:H), a laser-crystallized silicon, or a solid-phase crystallized silicon induced by metal catalyst, whereby a carrier can be injected at high speed into the i-type amorphous semiconductor layer, and it is possible to use the high-speed carrier relaxation phenomenon of an i-type amorphous semiconductor such as a-Si:H. Therefore, the configuration is capable of high-speed operation and is capable of acting as an electro-optical modulator having low optical loss.

Furthermore, the p-type semiconductor layer and the re-type semiconductor layer may be disposed so to be layered vertical direction via a optical waveguide comprising an i-type amorphous semiconductor as shown in FIGS. 1 and 3, or may be disposed so as to be layered in the lateral direction via an i-type amorphous semiconductor as shown in FIG. 5, or may be disposed so as to face each other in the lateral direction via an i-type amorphous semiconductor.

REFERENCE SIGNS LIST

101 Silicon substrate
102 p-type a-SiC:H layer
103 i-type a-Si:H layer
104 n-type a-SiC:H layer
105 Zinc oxide/aluminum electrode
201 Silicon substrate
202 Silicon thermal oxide film
203 p-type μc-Si:H layer
204 i-type a-Si:H layer
205 n-type μc-Si:H layer
206 Silicon oxide film
207 ITO film
208 Electrode
209 Electrode
301 Silicon substrate
302 Silicon thermal oxide film
303 p-type μc-Si:H layer
304 i-type a-Si:H layer
305 n-type μc-Si:H layer
306 Silicon oxide film
307 IZO film
308 Electrode
309 IZO film
310 Electrode
311 Insulating film
401 Substrate
402 Lower cladding layer
403 Silicon-containing p-type semiconductor layer
404 Silicon-containing i-type semiconductor layer
405 Silicon-containing n-type semiconductor layer
406 Interlayer film
407 First optical waveguide comprising a silicon-containing amorphous semiconductor layer
408 Upper cladding layer
409 Electro-optical modulator, which is a second optical waveguide, having a pin junction in at least in a portion of thereof
501 Lower cladding layer
502 Interlayer film
503 Upper cladding layer
504 Ring resonator-type optical waveguide
505 First optical waveguide
506 p-type crystalline silicon layer
507 i-type hydrogenated amorphous silicon layer
508 n-type crystalline silicon layer
601 Lower cladding layer
602 Interlayer film
603 Upper cladding layer
604 Silicon optical waveguide
605 Optical multiplexer/demultiplexer
606 Interference optical waveguide
607 Vertical directional coupler
608 i-type hydrogenated amorphous silicon layer
609 p-type crystalline silicon layer
610 n-type crystalline silicon layer

The invention claimed is:

1. An optical semiconductor device, characterized in that a first optical waveguide comprising a silicon-containing amorphous semiconductor layer and a second optical waveguide containing a silicon-containing i-type semiconductor layer as a constituent element are disposed in different layers in a range in which optical interaction can occur, an electro-optical modulator having a pin junction structure comprising a p-type semiconductor layer, an i-type semiconductor layer, and an n-type semiconductor layer is provided to at least a portion of the second optical waveguide, and the index of refraction of the second optical waveguide is varied by the electro-optical modulator to thereby modulate the light waves propagated through the first optical waveguide.

2. The optical semiconductor device according to claim 1, characterized in that the silicon-containing amorphous semiconductor layer constituting the first optical waveguide is a hydrogenated amorphous silicon layer.

3. The optical semiconductor device according to claim 1, characterized in that the silicon-containing i-type semiconductor layer is an i-type amorphous semiconductor layer.

4. The optical semiconductor device according to claim 3, characterized in that the silicon-containing i-type semiconductor layer is a hydrogenated amorphous silicon layer.

5. The optical semiconductor device according to claim 3, characterized in that the silicon-containing i-type semiconductor layer is a hydrogenated amorphous Si—Ge layer.

6. The optical semiconductor device according to claim 1, characterized in that the p-type semiconductor layer and/or the n-type semiconductor layer constituting the pin junction in the electro-optical modulator is a silicon-containing crystalline semiconductor layer.

7. The optical semiconductor device according to claim 6, characterized in that the silicon-containing crystalline semiconductor layer comprises a microcrystalline silicon layer.

8. The optical semiconductor device according to claim 6, characterized in that the silicon-containing crystalline semiconductor layer comprises a laser-crystallized silicon layer.

9. The optical semiconductor device according to claim 6, characterized in that the silicon-containing crystalline semiconductor layer comprises a solid-phase crystallized silicon layer induced by a metal catalyst.

10. The optical semiconductor device according to claim 6, characterized in that the silicon-containing crystalline semiconductor layer comprises a single-crystalline silicon layer.

11. The optical semiconductor device according to claim 6, characterized in that silicon-containing crystalline semiconductor layer comprises a microcrystalline SiC layer.

12. The optical semiconductor device according to claim 6, characterized in that the silicon-containing crystalline semiconductor layer is a microcrystalline SiO layer.

13. The optical semiconductor device according to claim 1, characterized in that the p-type semiconductor layer and the n-type semiconductor layer are disposed so to be layered in the vertical direction via a silicon-containing i-type semiconductor layer, which is a constituent element of the second optical waveguide.

14. The optical semiconductor device according to claim 1, characterized in that the p-type semiconductor layer and the n-type semiconductor layer are disposed so to be layered in the lateral direction via a silicon-containing i-type semiconductor layer, which is a constituent element of the second optical waveguide.

15. The optical semiconductor device according to claim 1, characterized in that the second optical waveguide containing the silicon-containing i-type semiconductor layer as a constituent element is a ring resonator-type optical waveguide.

16. The optical semiconductor device according to claim 1, characterized in that the optical semiconductor device is a Mach-Zehnder interferometer and has a second optical waveguide provided with an electro-optical modulator having the pin junction structure disposed so as to be separated by an interlayer film in the layering direction in an interference arm.

17. The optical semiconductor device according to claim 2, characterized in that the silicon-containing i-type semiconductor layer is an i-type amorphous semiconductor layer.

18. The optical semiconductor device according to claim 17, characterized in that the silicon-containing i-type semiconductor layer is a hydrogenated amorphous silicon layer.

19. The optical semiconductor device according to claim 17, characterized in that the silicon-containing i-type semiconductor layer is a hydrogenated amorphous Si—Ge layer.

* * * * *